United States Patent [19]
York

[11] Patent Number: 5,823,477
[45] Date of Patent: Oct. 20, 1998

[54] DEVICE AND METHOD FOR MINIMIZING RADIATOR AREA REQUIRED FOR HEAT DISSIPATION ON A SPACECRAFT

[75] Inventor: Gary M. York, Gardena, Calif.

[73] Assignee: Hughes Electronics Corporation, Los Angeles, Calif.

[21] Appl. No.: 577,574

[22] Filed: Dec. 22, 1995

[51] Int. Cl.$^6$ ............................................. B64G 1/50
[52] U.S. Cl. ............................ 244/163; 165/41; 165/171
[58] Field of Search ............................... 244/163; 165/41, 165/104.14, 171

[56] References Cited

U.S. PATENT DOCUMENTS 4,880,050  11/1989  Nakamura et al. ..................... 244/163
5,351,746  10/1994  Mackey et al. .
5,372,183  12/1994  Strickberger ........................... 244/163

*Primary Examiner*—Robert J. Oberleitner
*Assistant Examiner*—Tien Dinh
*Attorney, Agent, or Firm*—Terje Gudmestad; M. W. Sales

[57] ABSTRACT

Device and method for minimizing radiator area required for heat dissipation on a satellite. The device includes radiator panels with heat pipes embedded throughout. The embedded heat pipes have flanges that protrude from the plane of the surface of the radiator panel. Units, such as amplifiers and RF filters, are mounted on L shaped heat pipes. The unit heat pipes are mounted on the flanges of the embedded heat pipes. The unit heat pipes are thermally linked to the same area of the radiator panel, thereby minimizing radiator area necessary for heat dissipation.

28 Claims, 2 Drawing Sheets

DEVICE AND METHOD FOR MINIMIZING RADIATOR AREA REQUIRED FOR HEAT DISSIPATION ON A SPACECRAFT

BACKGROUND OF THE INVENTION

A satellite is a type of spacecraft that orbits either the earth or another body of the solar system. There are two main classes of satellites: information satellites and communications satellites. Information satellites transmit signals related to atmospheric and meteorological data, infrared, ultraviolet, gamma and X-ray studies of celestial objects, and surveys of the earth's shape, surface, and resources. Communications satellites receive radio frequency signals from earth by means of highly directional aerials and return them to another earth location for purposes such as long-distance telephony and television broadcasting.

A satellite typically includes a payload module and a platform module. For a communications satellite, the payload is the communications equipment necessary to perform the mission. The platform typically includes the following subsystems: (1) power; (2) attitude and control; (3) propulsion; (4) on-board telemetry tracking and command (TTC); (5) thermal control; and (6) structure. These subsystems play a vital role throughout the satellite's operational life.

The thermal control subsystem achieves temperature balance and proper performance of all subsystems. Electronic components utilized throughout the various subsystems experience thermal stress resulting from high temperature effects from the sun, from low temperatures occurring during eclipse, and from heat dissipated internally by components located aboard the satellite. Thermal devices, such as radiators, are commonly used to protect the electronic equipment from thermal stress. Radiators used on satellites typically include sheets of a highly thermally conductive solid material. To provide maximum heat radiation to space, high power dissipation components are commonly mounted directly to the radiator panel.

The heat dissipated by amplifiers and output radio frequency (RF) filters varies depending on the drive level of the amplifier. As the amplifier output radio frequency energy increases, the heat dissipated by the amplifier decreases and the heat dissipated by the RF filter increases. In known thermal control methods, the amplifiers and RF filters, collectively referred to as units, are mounted to thermally distinct areas of the radiator panel. Thus, when amplifiers dissipate heat, only the amplifier portion of the radiator panel heats up leaving the filter portion cold. To prevent damage to the filters, heaters are used to maintain an acceptable temperature.

When sections of the radiator panel are dedicated to particular types of units, more radiator area is needed. Increased radiator area reduces the space available for other items necessary for the satellite mission and results in a heavier, more costly satellite.

Accordingly, there is a need for a device which minimizes the radiator area necessary for heat dissipation on a satellite while maintaining acceptable temperatures for units mounted on the radiator.

SUMMARY OF THE INVENTION

The present invention provides a device and method which can be implemented in the thermal control subsystem of a satellite. The device and method thermally link units such as RF filters and amplifiers to the same radiator area to minimize the area required for heat dissipation.

In a first preferred embodiment, each type of unit is mounted to unit heat pipes dedicated to the particular type of unit. The unit heat pipes are then connected to heat pipes embedded in the radiator panel. In a second preferred embodiment, the units are mounted directly to the heat pipes embedded in the radiator. In both preferred embodiments, the unit heat pipes are connected to as many radiator heat pipes as necessary to dissipate heat while maintaining the units at an acceptable temperature.

The device and method of the present invention provides several benefits to the thermal design of a satellite. Thermally linking the units to the same radiator area minimizes the area required to dissipate heat. It also reduces the extreme fluctuations that the units experience when each type of unit is mounted to separate radiator areas. The thermally linked units experience less thermal stress, thereby reducing performance variations and increasing unit life. The device and method reduce satellite cost by minimizing size, and simplify the thermal control subsystem by eliminating the need for additional thermal control mechanisms such as heaters.

The invention itself, together with further objects and attendant advantages, will be understood by reference to the following detailed description, taken in conjunction with the accompanying drawings.

DETAILED DESCRIPTION OF THE DRAWINGS

Figure 1:
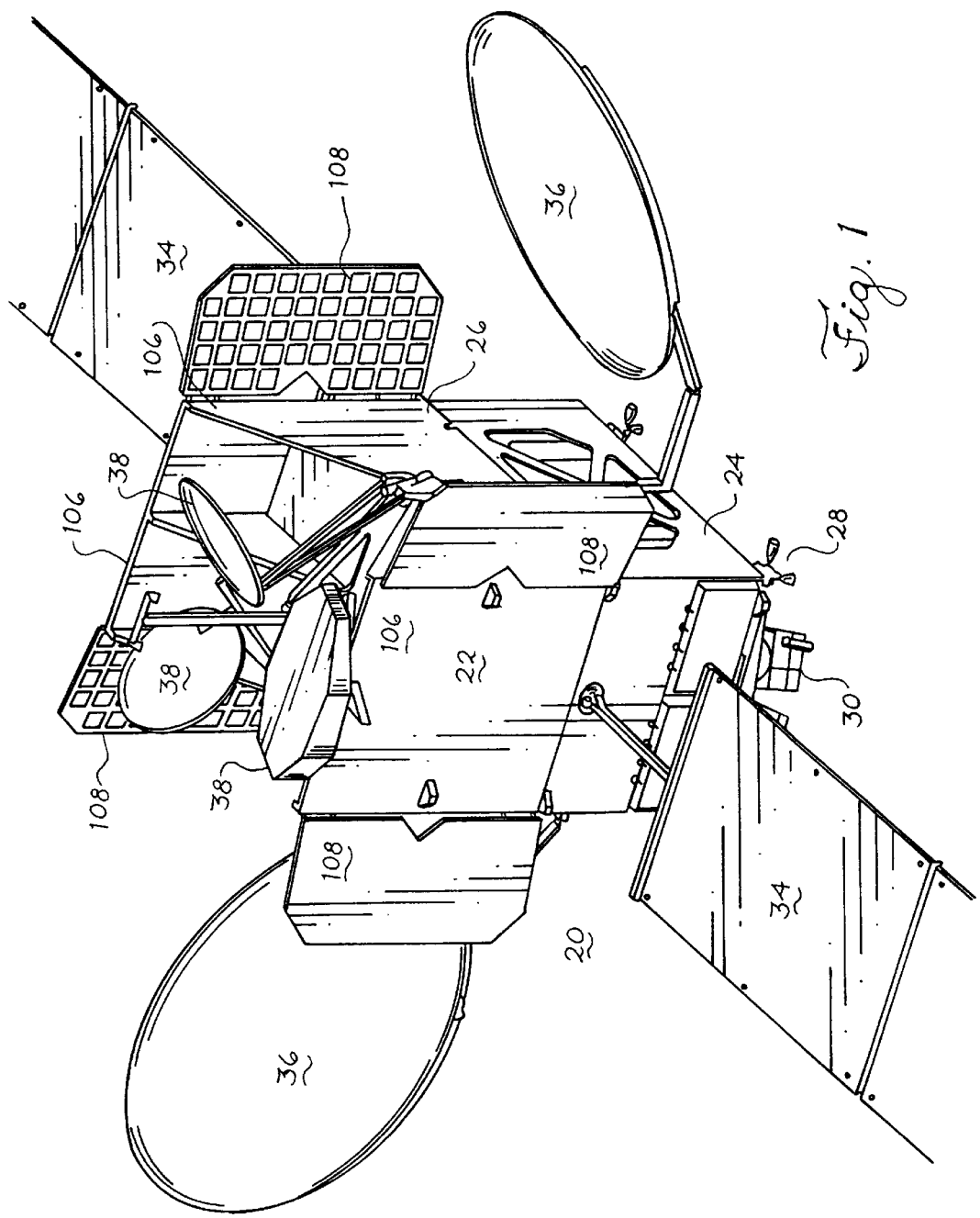
FIG. 1 is a diagram of a satellite capable of utilizing the present invention.

A spacecraft or satellite 10 capable of utilizing the present invention is shown in FIG. 1. The satellite 10 has a spacecraft body 12 which includes a lower bus module or platform 14 and an upper payload module 16. Attached to the aft end of the lower bus module 14 are a plurality of engines. These engines include a centrally positioned liquid orbital thruster (not shown), four chemical propulsion engines 24 located at the corners of the bus module 14 and two pairs of xenon ion propulsion engines 26 (one pair shown). Lower bus module 14 contains fuel tanks (not shown) and various power and control modules that operate the engines and power the payload module 16. Bus module 14 further includes a pair of solar panels 18 that convert sunlight into electricity. The electricity is sent to batteries (not shown) located on the bus module 14. Bus module 14 also has a pair of antennae 20, which receive signals from an earth ground station. The antennae 20 reflect the received signals into reflectors 22, which in turn, reflect the signals into receivers (not shown). The antennae 20 are used to control the satellite 10 and to send signals to the ground station.

Payload module 16 is attached to the bus module 14 and contains a variety of electronic equipment which may contain a number of sensors (not shown). The electronic equipment processes information gathered by the sensors and sends the processed information back to the ground station via antennae 20. The gathered information may concern for example, communications, weather observation, and navigational information.

Figure 2:
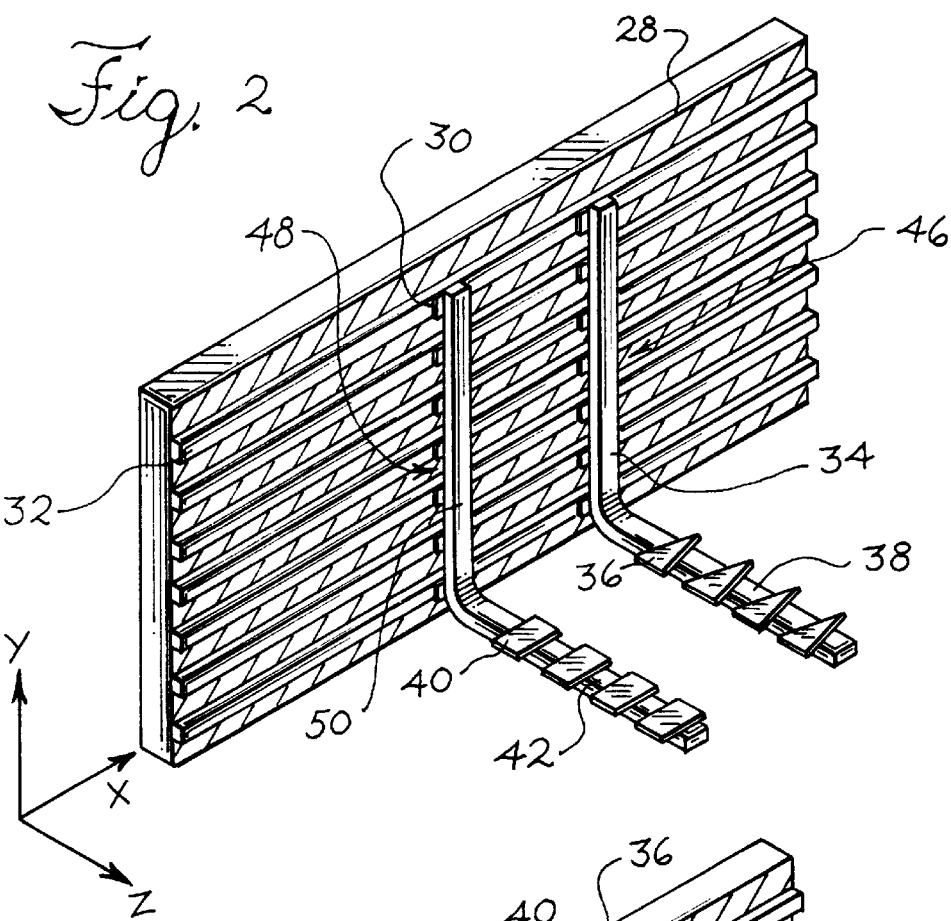
FIG. 2 illustrates a perspective view of a first preferred embodiment of the present invention which can be utilized on the satellite of FIG. 1.

FIG. 2 is a perspective view of a first preferred embodiment of the present invention which can be utilized on the satellite of FIG. 1. The device of the present invention includes a radiator panel 28 located on the north and south sides of the platform module 14 (FIG. 1). The radiator panel 28 is preferably constructed of a honeycomb core (not shown) adhesively affixed between two solid aluminum face sheets (not shown). In the presently preferred embodiment, the cell size of the core is 3/16 of an inch, the thickness of the core is 3/4 to 1 inch, and the thickness of the aluminum face sheets is 10 to 20 mils. A groove is cut in the honeycomb core so that heat pipes can be embedded in the radiator panel 28. The heat pipes 32 are bonded to the aluminum face sheets using a structural adhesive commonly known in the art. Preferably, the heat pipes 32 are thermally connected throughout the face sheet and have flanges 30 which protrude past the plane of the surface of the radiator panel 28. The flanges 30 are used to provide a connection point for coupling one heat pipe to another.

Figure 3:
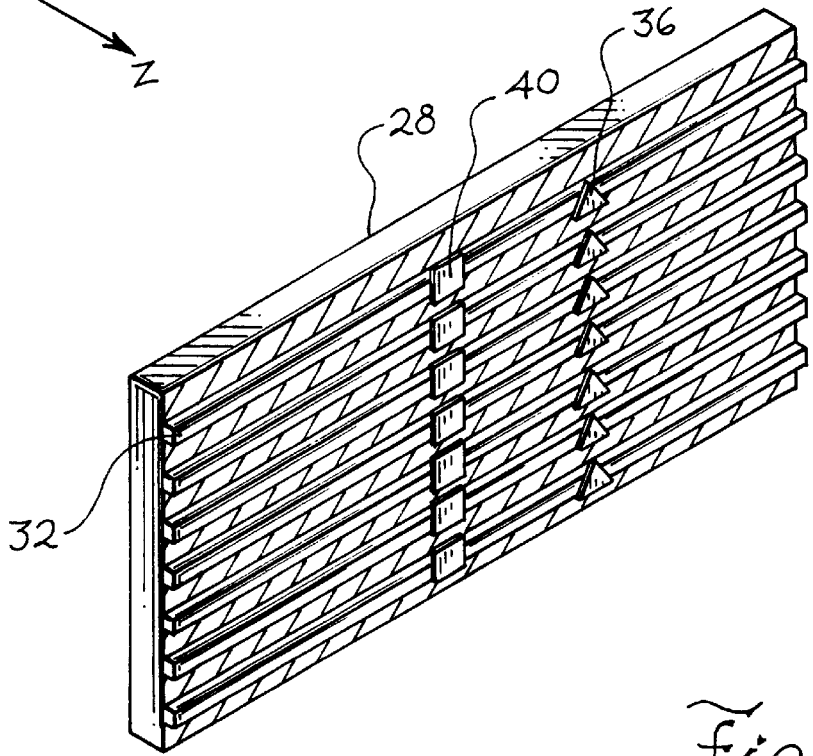
FIG. 3 illustrates a top view of a second preferred embodiment of the present invention which can be utilized on the satellite of FIG. 1.

Also shown in FIG. 2 is a unit heat pipe 46 with amplifiers mounted thereon, and another unit heat pipe 48 with filters mounted thereon. The unit heat pipes 46, 48 are preferably L shaped, having an equipment shelf component 38, 42 and a thermal connection component 34, 50 that provides a direct thermal connection to the embedded radiator heat pipes 32. The units 36, 40 are mounted to the equipment shelf component 38, 42 of the heat pipe 46, 48. The thermal connection component 34, 50 of each unit heat pipe 46, 48 is preferably connected to the flanges 30 of the embedded radiator heat pipes 32. The unit heat pipes 46, 48 are connected to as many embedded radiator heat pipes 32 as necessary for dissipating heat while maintaining the units 36, 40 at a desired temperature. FIG. 3 illustrates a top view of a second preferred embodiment of the present invention. In the second embodiment, amplifiers 36 and filters 40 are mounted directly on the flanges 30 (not shown) of the embedded radiator heat pipes 32. In both preferred embodiments, the dimensions of the embedded heat pipes 32 and the unit heat pipes 46, 48 are 1/2 inch and 3/4 inch, respectively. The working fluid in the heat pipes is preferably ammonia.

The device and method of the present invention provides several benefits to the thermal design of a satellite. Thermally linking the units to the same radiator area minimizes the area required to dissipate heat. The radiator area required to reject the unit dissipation is a function of the amount of heat generated by the units, the amount of solar heat absorbed by the radiator, and the emittance of the radiator to space. The heat generated by the units is a function of the amplifier efficiency. The solar heat absorbed by the radiator and the heat rejected by the radiator are a function of the radiator surface absorptance ($\alpha$) and emittance ($\epsilon$). Table 1 provides an example of the radiator areas required to reject the heat generated by units assuming 32 units with an amplifier efficiency of 60 percent and an output power of 100 watts. The radiator absorptance is 0.27 and the emittance if 0.80.

TABLE 1

Radiator Area Required to Reject Unit Dissipation for Saturated Drive and No-Drive Conditions

| Unit | Saturated Drive Dissipation (watts) | Radiator Area Required (square meters) | No Drive Dissipation (watts) | Radiator Area Required (square meters) |
|---|---|---|---|---|
| TWT | 1856.0 | 2.951 | 2304.0 | 3.663 |
| Output | 608.0 | 0.967 | 0.0 | 0.967 |
| Filter | | | | |
| Total | | 3.918 | | 4.630 |

Table 1 illustrates one example of a pair of units having first and second operational states. In the first state, a first unit generates a maximum amount of heat and a second unit generates a minimum amount of heat, whereas in the second operational state the first unit generates a minimum amount of heat and the second unit generates a maximum amount of heat. Other combinations of heat generating units having similar heat dissipation relationships as those disclosed in Table 1 will be obvious to those of ordinary skill in the art and are contemplated by the inventor as having use in connection with the present invention.

The area required to reject the heat generated by the units when the TWT is in the saturated condition is 2.951 square meters for the TWTs and 0.967 square meters for the output filters. Thus, the total area required is 3.918 square meters. The area required to reject the heat generated by the units when the TWT is in the no-drive condition increases to 3.663 square meters for the TWTs and remains at 0.967 square meters for the output filters, for a total of 4.630 meters. When the TWT is in the no-drive condition, the heat dissipated by the output filters decreases to zero because no energy is dissipated when no signal is present from the TWTs. However, if the radiator areas of the units are not thermally connected, the radiator area required to reject the output filters' dissipation at saturated drive must be allocated in the total radiator area. Thus, the total radiator area required is 4.630 square meters when the units do not share a common radiator area. Replacement heater power is also required to maintain filter temperatures above low temperature limits if the two areas are not thermally connected. The total radiator area required is less (3.663 meters) if the two areas are thermally connected and the need for a replacement heater is eliminated.

The present invention reduces extreme temperature fluctuations that the units experience when each type of unit is mounted to separate radiator areas. The thermally linked units experience less thermal stress, thereby reducing performance variations and increasing unit life. The present invention also reduces satellite cost by minimizing size.

It should be understood that a wide range of changes and modifications can be made to the preferred embodiment described above. For example, there can be a combination of amplifiers 36 mounted directly to the flanges 30 of the embedded heat pipes 32 (FIG. 3) and filters 40 mounted on unit heat pipes 48 and connected to the embedded heat pipes 32 of the radiator panel 28 (FIG. 2). It is therefore intended that the foregoing detailed description be regarded as illustrative rather than limiting and that it be understood that it is the following claims, including all equivalents, which are intended to define the scope of this invention.

What is claimed is:

1. A device for dissipation of heat in a satellite wherein heat is generated by first and second units having first and second states, the first unit generating a greater amount of heat in the first state than in the second state and the second unit generating a lesser amount of heat in the first state than in the second state, wherein the total heat generated by the first and the second units in either the first state or the second state is less than the sum of the maximum heat generated by the first unit and the maximum heat generated by the second unit, the device comprising:

a radiator panel having a radiator area large enough to reject the total heat generated by the first and the second units in either the first state or the second state, wherein the radiator area is smaller than a heat rejection areas required to reject an amount of heat equal to the sum of the maximum heat generated by the first unit and the maximum heat generated by the second unit;

a plurality of radiator heat pipes embedded in the radiator panel; and first and second unit heat pipes thermally connected to the radiator heat pipes with the first unit thermally connected to the first unit heat pipe and the second unit thermally connected to the second unit heat pipe.

2. The device of claim 1 wherein the radiator heat pipes have flanges that protrude from the radiator panel, the flanges forming a thermal connection between the radiator heat pipes and the first and second unit heat pipes.

3. The device of claim 1 wherein the first unit heat pipe is thermally connected to a plurality of first units and the second unit heat pipe is thermally connected to a plurality of second units.

4. The device of claim 1 wherein the first unit is an amplifier.

5. The device of claim wherein the second unit is a filter.

6. The device of claim 1 wherein the radiator heat pipes are thermally connected throughout the radiator panel.

7. The device of claim 1 wherein the first and second unit heat pipes are thermally connected to the radiator heat pipes such that the first and second unit heat pipes are parallel to each other.

8. The device of claim 1 wherein each unit heat pipe is connected to each radiator heat pipe.

9. A method of dissipation of heat in a satellite wherein heat is generated by first and second units having first and second states, the first unit generating a greater amount of heat in the first state than in the second state and the second unit generating a lesser amount of heat in the first state than in the second state, wherein the total heat generated by the first and the second units in either the first state or the second state is less than the sum of the maximum heat generated by the first unit and the maximum heat generated by the second unit, the method comprising the steps of:

embedding radiator heat pipes in a radiator panel having a radiator area large enough to reject the total heat generated by the first and the second units in either the first state or the second state, wherein the radiator area is smaller than a heat rejection area required to reject an amount of heat equal to the sum of the maximum heat generated by the first unit and the maximum heat generated by the second unit;

thermally connecting the first unit on a first unit heat pipe and the second unit on a second unit heat pipe; and thermally connecting the first and second unit heat pipes with the first and second units thermally connected thereon to the radiator heat pipes.

10. The method of claim 9 wherein the radiator heat pipes have flanges that protrude from the radiator panel and the unit heat pipe connecting step further comprising the step of thermally connecting the first and second unit heat pipes to the flanges.

11. The method of claim 9 wherein the unit connecting step further comprises the step of thermally connecting a plurality of first units to the first unit heat pipe and a plurality of second units to the second unit heat pipe.

12. The method of claim 9 wherein the first unit is an amplifier.

13. The method of claim 9 wherein the second unit is a filter.

14. The method of claim 9 wherein the radiator heat pipes are thermally connected throughout the radiator panel.

15. The method of claim 9 wherein the unit heat pipe connecting step further includes the step of connecting the plurality of unit heat pipes to the radiator heat pipes such that the unit heat pipes are parallel to each other.

16. The method of claim 9 wherein the unit heat pipe connecting step further includes the step of connecting each unit heat pipe to each radiator heat pipe.

17. A device for dissipation of heat in a satellite wherein heat is generated by first and second units having first and second states, the first unit generating a greater amount of heat in the first state than in the second state and the second unit generating a lesser amount of heat in the first state than in the second state, wherein the total heat generated by the first and the second units in either the first state or the second state is less than the sum of the maximum heat generated by the first unit and the maximum heat generated by the second unit, the device comprising:

a radiator panel having a radiator area large enough to reject the total heat generated by the first and second units in either the first state or the second state, wherein the radiator area is smaller than a heat rejection area required to reject an amount of heat equal to the sum of the maximum heat generated by the first unit and the maximum heat generated by the second unit;

a plurality of radiator heat pipes embedded in the radiator panel with the first and second units thermally connected to the radiator heat pipes.

18. The device of claim 17 wherein the radiator heat pipe has flanges that protrude from the radiator panel, the flanges forming a thermal connection between the radiator heat pipes and the first and second units.

19. The device of claim 17 further comprising a plurality of first and second units with each radiator heat pipe having at least one first unit and at least one second unit thermally connected thereto.

20. The device of claim 17 wherein the first unit is an amplifier.

21. The device of claim 17 wherein the second unit is a filter.

22. The device of claim 17 wherein the radiator heat pipes are thermally connected throughout the radiator panel.

23. A method of dissipation of heat in a satellite wherein heat is generated by first and second units having first and second states, the first unit generating a greater amount of heat in the first state than in the second state and the second unit generating a lesser amount of heat in the first state than in the second state, wherein the total heat generated by the first and the second units in either the first state or the second state is less than the sum of the maximum heat generated by the first unit and the maximum heat generated by the second unit, the method comprising the steps of:

embedding radiator heat pipes in the radiator panel having a radiator area large enough to reject the total heat generated by the first and the second units in either the first state or the second state, wherein the radiator area is smaller than a heat rejection area required to reject an amount of heat equal to the sum of the maximum heat generated by the first unit and the maximum heat generated by the second unit; and thermally connecting the first and second units to one of the radiator heat pipes.

24. The method of claim 22 wherein the radiator heat pipes have flanges that protrude from the radiator panel and the connecting step further comprises the step of thermally connecting the first and second units to the flanges.

25. The method of claim 23 wherein the connecting step further comprises the step of thermally connecting a plurality of first and second units to the radiator heat pipes, each heat pipe having at least one first unit and one second unit connected thereto.

26. The method of claim 23 wherein the first unit is an amplifier.

27. The method of claim 23 wherein the second unit is a filter.

28. The method of claim 23 wherein the radiator heat pipes are thermally connected throughout the radiator panel.

* * * * *